March 31, 1936. G. C. JETT 2,035,703
ENDLESS TRACK MECHANISM
Filed July 18, 1932 2 Sheets-Sheet 1
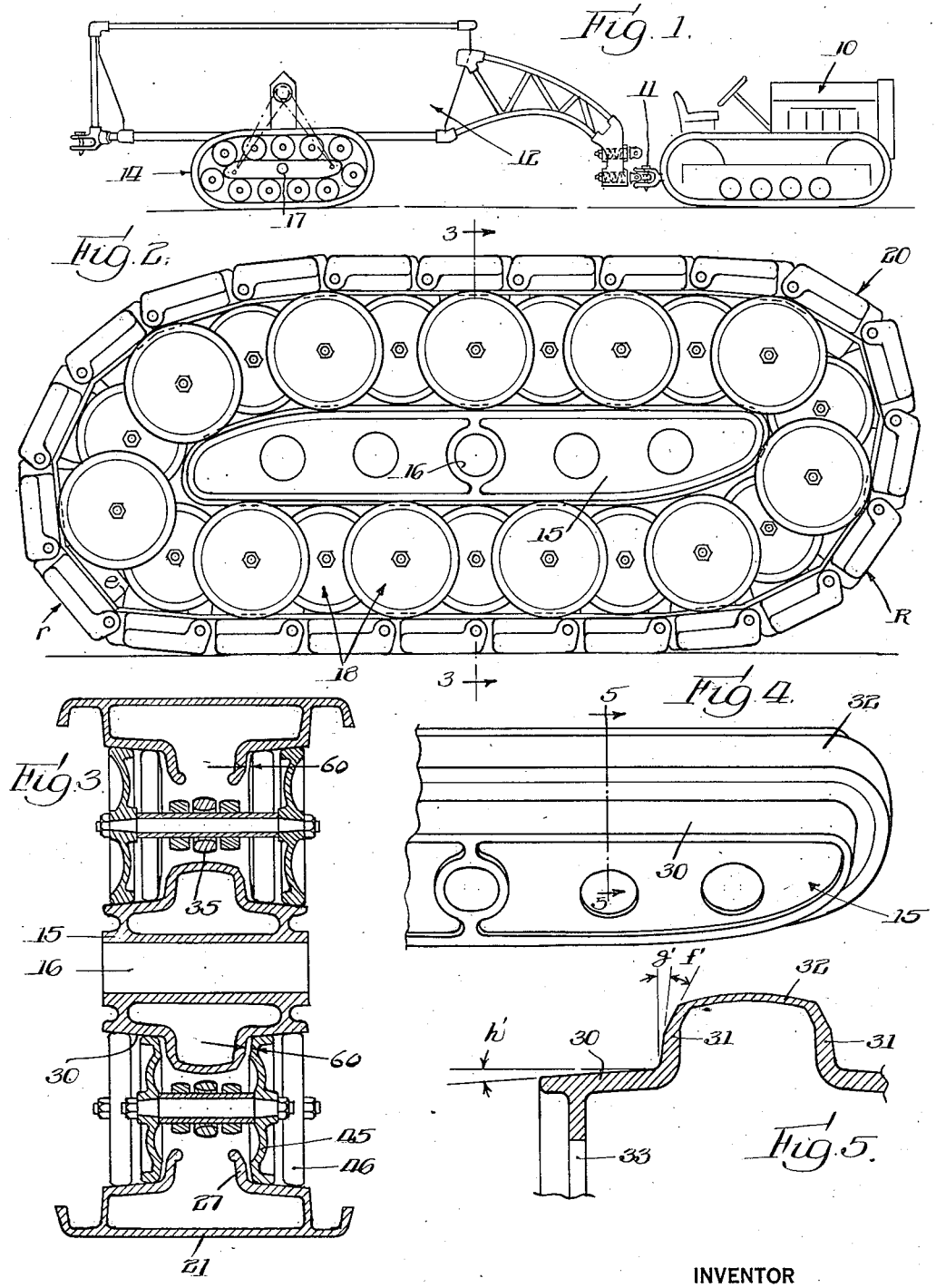
INVENTOR
George C. Jett,

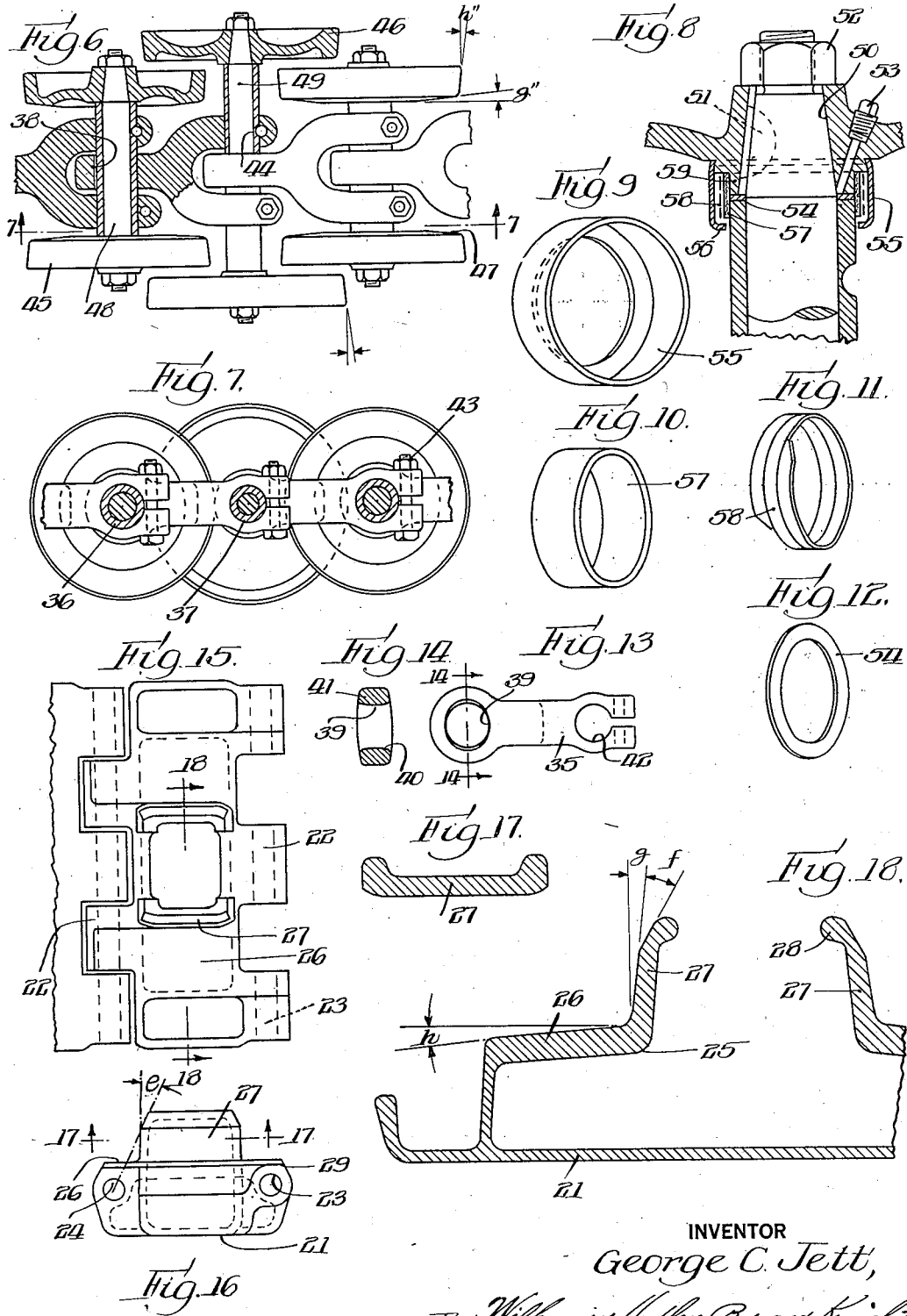

Patented Mar. 31, 1936

2,035,703

UNITED STATES PATENT OFFICE 2,035,703

ENDLESS TRACK MECHANISM

George C. Jett, Milwaukee, Wis.

Application July 18, 1932, Serial No. 623,050

23 Claims. (Cl. 305—4)

The invention relates to improvements in tractors and more particularly to roller wheels of the type employed in carrying heavy loads over soft or plowed ground without any previous preparation of roadways. One of the useful fields for the present device is in earth hauling wherein one or more trailer wagons are drawn by a tractor to haul the earth from the locomotive crane or loading station to the dump, the wagons being mounted on roller wheels having long flat areas on the ground, permitting large and heavy loads to be drawn over bad ground conditions with a minimum draw bar pull.

It is an object of the invention to provide a very high capacity light draft trailer employing roller wheels, which will be simple in construction, economical to manufacture, and which will give long life and therefore a small depreciating loss to the owner and user.

The virtues of high capacity, light draft, light weight and simplified construction reside particularly in the unique general design and arrangement of its parts. Essentially, the present construction consists of three assembled units, namely, a main center frame having on its outer oblong periphery the center rail, a track shoe band made up of a series of articulated shoe links for contact with the ground on its outer surface and having rail faces on the inner side of the track shoe band forming thereby the flexible outer member, and lastly, a band of articulated links carrying rollers, the same being located between the center rail on the frame and the track shoe band. In operation the rollers roll on the shoe rails and the load is transmitted diametrically across the roller to the main frame which supports the rollers to either side of the center rail. The load of the trailer wagon is thus transmitted to the pivotal center of the frame where connection is made between the wagon and traction members for supporting and carrying the same.

With these and various other objects in view, the invention may consist of certain novel features of construction and operation as will be more fully described and particularly pointed out in the specification, drawings and claims appended hereto.

In the drawings which illustrate an embodiment of the device and wherein like reference characters are used to designate like parts—

Figure 1 is an illustration of a tractor drawing a trailer wagon supported and carried by roller wheels constructed in accordance with the present invention;

Figure 2 is an elevational view of the complete roller wheel of the invention;

Figure 3 is a vertical transverse sectional view taken along line 3—3 of Figure 2;

Figure 4 is a perspective view of a portion of the main frame;

Figure 5 is a vertical transverse sectional view taken through a section of the frame substantially on line 5—5 of Figure 4;

Figure 6 is a plan view, parts being shown in section, of the articulated links having connection with the rollers;

Figure 7 is a longitudinal sectional view taken substantially on line 7—7 of Figure 6;

Figure 8 is an enlarged section of the roller hub showing the method of securing the roller to its shaft, the means for providing lubrication and the dirt seal;

Figures 9, 10, 11 and 12 are perspective views of the dirt seal and thrust washer details;

Figure 13 shows in side elevation one of the roller links;

Figure 14 is a vertical sectional view through the link substantially along line 14—14 of Figure 13;

Figure 15 is a plan view of a track shoe making up the track shoe band;

Figure 16 is a side elevation of the track shoe;

Figure 17 is a horizontal sectional view taken along line 17—17 of Figure 16, and Figure 18 is a fragmentary enlarged sectional view taken substantially along the line 18—18 of Figure 15 and showing in detail the formation on the inner surface of the track shoe for providing rails for supporting the rollers.

Referring generally to Figure 1 a tractor 10 of any conventional type is shown as having connection at 11 to a trailer wagon designated in its entirety at 12, the same being supported and carried by the roller wheel 14 of the present invention. More particularly Figures 2 to 5 inclusive show the present structure as consisting of a main frame 15 having a pivotal center supporting journal 16 to receive the pivot axle 17 or the load carrying axle of the trailer wagon 12. A band made up of a series of rollers designated generally by 18, Figure 2, loosely envelopes the main frame and carries a track shoe band indicated by 20 which makes contact with the ground and provides the traction surface for the vehicle supported.

Considering first the track shoe band 20, the same is shown in Figures 15, 16 and 18 as comprising a series of articulated track shoe links 21 providing on one surface a substantially flat supporting area and having formed on its respective sides a plurality of interlocking lugs 22 having openings 23 and 24 extending therethrough, through which are inserted hinged pintles to hingedly connect the shoes to each other, forming the complete track shoe band. The distance between the pintle holes 23 and 24 will hereinafter be referred to as the pitch of the track shoe. On the inside of the shoe the walls 25 provide broad sloping rail surfaces 26 located on the respective sides of the center of the shoe for supporting the rollers 18 which roll thereon. From the inside of the rails 26 and forming a continuation of the walls 25 are upstanding guide flanges 27 rounded at their upper terminal end 28 and having an arcuate form in plan as shown in Figures 15 and 17 so as to more effectively guide the rollers 18. The rails 26 are continued as at 29 as far as possible beyond the pintle holes 23 and 24 and the pintle holes are located as close as possible to the rail surfaces to obtain smooth unbroken rail surfaces for the rollers to travel on.

In general, it may be stated that the shoe is made of a deep integral one piece casting hollowed out between the rail surfaces 26 forming the walls 25 for lightness and economy. For convenience in design and freedom from clogging the guide flanges 27 are chosen to be placed on the inner edges of the rails making the shoe symmetrical. The depth of the shoe, that is, from surface 26 to the base 21, is about one-half of the shoe pitch, which depth raises the rails high above the ground, giving freedom from clogging by loose earth, material, etc., which might flow onto the rail surfaces in the path of the rollers and for a further provision against clogging the rail surfaces are sloped outwardly forming angle $h$. The peculiar double angular slopes $f$ and $g$ on the guide flanges and the angle $e$ at their upper edges, have functional advantages which will be explained later.

The main frame 15 is an integral one piece casting. As shown in Figures 4 and 5 a pair of rail surfaces 30 are formed on the periphery of the frame to the outside of inner upstanding guide flanges 31 joined by wall 32. Accordingly, the frame is symmetrical, having the curved web member 32 securing the symmetrical half into one rigid frame. The frame may be hollowed out in any suitable manner and for this purpose core anchor holes 33 are provided in the sides.

The peculiar straight and curved contour of the rail surfaces 30 throughout their length, the rail slope $h'$, and the double angular slope $f'$ and $g'$ of the guide flanges all have functional advantages which will be more clearly brought out as the description proceeds. A band of articulated links, as shown in Figures 6 and 7, carries a series of overlapping rollers, the links 35 being pivotally connected by tubes 36 and 37. The distance between the tubes is hereafter referred to as the pitch of the links. The pivotal connection at 38 is loosely formed so as to give approximately the action of a ball and socket joint, the details of the formation of this universal action joint being shown in Figures 13 and 14 where the opening 39 has a round, easy moving fit at its center on the tubes by reason of the rounded upper and lower contour 40, giving the opening an oblong formation as shown. The sides of the link are tapered from the center as at 41, which, together with the curvatures 40, permit the link to have a free twisting movement in the chain which is highly desirable in order to relieve loads and stresses in the chain of links when the rollers are thrown out of alignment. It is the purpose of the chain to space the series of bearing tubes 36 and 37 but not to hold them in torsional alignment.

The links opposite opening 39 are bifurcated, providing a pair of arms, each having a slotted opening 42 to fit tightly around tubes 36 and 37. By means of securing bolts 43 the forked ends are secured to the tubes with one securing bolt of each pair fitting in groove 44 to thereby positively locate the link. The chain of links having bearing tubes for their pintles forms the flexible framework which holds the rollers in spaced relation and holds the entire band of rollers on the main frame.

The rollers 18, Figure 2, are shown in assembled detail in Figures 6 and 7 and in these figures will be designated as inside rollers 45 and outside rollers 46. The tread faces of all the rollers are conical, the angle $h''$ of the face being equal to angle $h$ of the track shoe rail surfaces. Guide flanges 47 are provided only on the inside rollers and have a slope $g''$ equal to slope $g$ of the track shoe guide flanges 27. Short axles 48 and long axles 49 are secured to their respective inside and outside rollers in a manner as shown in Figure 8.

The axles journalled in the tubes constitute the only bearings in the machine. There is no determinable load on these bearings, their whole duty being to support the chain links 35 and to hold the rollers in spaced relation. However, there can be an undeterminable twisting strain on all of the axles due to a possible differential rotation of each wheel on the same axle caused by slight inaccuracies in the diameters of the two rollers on the same axle. Further, the inside rollers do all the guiding and when, for instance, the wagon is travelling on a side hill a considerable load comes on the guide flanges 47 which load is transmitted in bending stresses to the short axles 48 only. Because the short axles are subjected to a greater and compound stress they are made of larger diameter than the long axles which have a lesser or only a simple stress. In carrying out the objects of the strong and rugged construction together with accessibility for replacement of the parts the hubs of the rollers are tapered as at 50, Figure 8. The axles at their ends are correspondingly tapered and keyed as at 51 and the roller is detachably secured to its shaft by nut 52. Lubrication is provided for at 53 and replacement for end thrust wear by the replaceable thrust washers 54.

The axle journal bearing surfaces inside the tubes are adequately protected by a dirt protecting sleeve 55 secured to the roller hub and extending therefrom and surrounding its bearing tube. The sleeve is turned down at 56 to permit a close fit with the bearing tube at its outside open end and which further provides a protection and a keeper for the more delicate and effective dirt protection details shrouded within the sleeve. Covering the opening joint between the roller hub and the roller tube and located within sleeve 55 is a flexible dirt protection sleeve 57 of leather or other suitable material. Separately wound about the outside of leather sleeve 57 is a flat wire spring 58 which holds the sleeve in close wiping contact with the turned collar 59 on the roller hub and also the bearing tube. This effective means of dirt protection seals the open joint from exclusion of the lubricant and dust, dirt and other foreign matter from without.

It is desirable for obvious reasons to have rollers 18 of as large a diameter as possible. It is further desirable to have the distance between rollers less than the pitch of the track shoes so that there will always be at least one and at times two rollers on each shoe on the ground run of the track shoe band to prevent buckling of the shoes under the rollers throughout this run. It is further desirable to have the shoe pitch as short as possible for smooth and quiet running and to obtain the most flexible track shoe band. These several desirable proportions have been attained by the arrangement of the overlapping rollers alternately arranged in pairs on long and short axles which permits the rollers to be spaced at approximately two-thirds of one roller diameter. The track shoes can thus be shorter in pitch than one diameter of the roller and still have not less than one and at times two rollers bearing on a single track shoe. The extension of the track shoe rail surface 26 to the corners 29 or to a distance greater than the shoe pitch greatly facilitates this desirable feature of lengthening the effective track shoe rails and thereby having at least one and at times two rollers over and on each shoe at the ground run of the track shoe band, all as particularly shown in Figure 2.

The main frame 15 is one rigid shaped backbone member in the present machine and gives to the device its general shape and form. The flexible track shoe band 20 is guided and supported by the band of articulated rollers, which in turn have rolling engagement on the main frame and are guided and maintained in contact with the rail surfaces by the main guide flanges 31. With the roller wheel moving straight ahead as indicated by tractor 10, Figure 1, it is desirable that the track shoe band have a long radius R on its forward end and a corresponding smaller radius $r$ at the rear. The contours of the main frame rails 30 are therefore made in a series of long curves, straight lines and shorter curves as shown in order to give the ground run of the shoe band the most effective chosen contour for its best performance. Having the curve of small radius at the rear has the added advantage that it causes all the slack in the roller belt and the slack in the track shoe band to occur in the rear, it being necesssary to have some slack in these bands as a relief in clogging. A relatively tight shoe or roller band in front makes more favorable guiding of these members on the main frame.

The upper and lower contours of the main frame rails are made exactly alike. Since the roller wheel is mounted on pivotal axle 17 it is free to turn entirely if sufficiently clogged or obstructed in its path. Constructively, there is no top or bottom side to the present roller wheel.

Particular attention is given to all functional slopes at shoe rails and guide flanges, at main frame rails and guide flanges and tread face and guide flanges of the rollers. All of the several contacting areas, namely, shoe rails, frame rails and roller tread faces are given the same respective relative angles $h$, $h'$, and $h''$. All of the guide flanges, frame guide flanges and roller guide flanges have been given the same respective relative angles $g$, $g'$ and $g''$. These provisions of equal angles and large area contact on all rolling and wiping surfaces give long life to the parts which are subjected to the greatest wear and determine the life of the machine.

The greatest difficulty encountered in a machine of this class which must run in all loose soil conditions including crushed stone and trash is to keep the shoe band and the roller band on the frame as a unit and great care has been given to the choice of substantial elements and the arrangement of the several parts so as to give the desired liberal proportions on all functional parts effective in guiding and keeping the machine assembled when under trying and difficult services. Large diameter rollers permit the design of tall guide flanges on shoes and main frame. As an effective feature to this end the outer portion of the guide flanges on the shoe and frame are provided with a sharp angle $f$ and $f'$, respectively. Under normal travelling conditions only the portion of the guide flanges between the apex of the angles $f$ and $g$, $f'$ and $g'$ and their respective rails are in wiping, guiding contact with roller guide flanges 47.

With reference to Figure 3 it will be noted that the main frame rails 30 are low at their outer edges and high near their inner edges. For the same reason that a crown face pulley will keep the belt centered thereon this crowned rail will keep the belt carrying the rollers normally centered on the main frame, relieving the roller guide flanges 47 and their mating guide flanges on the frame and shoe from continued wiping contact, friction and wear. In order to facilitate this favorable functioning throughout a considerable clearance 60 has been provided between all the guide flanges.

With reference to Figures 2 and 16 it will be noted that angle $e$ intersects pintle holes 23 and 24 and is one-half the sharpest angle which the shoe belt can make as indicated by small radius $r$ at the lower quarter of the shoe band's turn at the rear and at the upper quarter of the shoe band's turn at the front. The provision of these bumping contact areas on liberal proportions gives stability and long life to the shoe band's end turns at these inadequately supported places.

It is to be understood that I do not wish to be limited by the exact embodiment of the device shown which is merely by way of illustration and not limitation, as various and other forms of the device will of course be apparent to those skilled in the art without departing from the spirit of the invention or the scope of the claims.

I claim:

1. In an endless track mechanism, an oblong frame providing rail surfaces on its periphery, rollers having movement on the rail surfaces, said surfaces being located on the respective sides of the longitudinal center line of the frame, certain of the rollers with respect to each surface being inside rollers and others being outside rollers, shafts joining the inside and outside rollers respectively, a bearing tube journalling each shaft, links connecting with the tubes for maintaining the shafts in connected relation, and an endless flexible tread band adapted for movement on the rollers.

2. In an endless track mechanism, an oblong frame providing rail surfaces on its periphery, rollers having movement on the rail surfaces, said surfaces being located on the respective sides of the longitudinal center line of the frame, certain of the rollers with respect to each surface being inside rollers and others being outside rollers, shafts joining the rollers, the shafts joining the inside rollers being shorter than those joining the outside rollers, links connecting the shafts, each link having a rigid connection to one shaft and a loose connection with an adjacent shaft, and an endless track shoe band located on the rollers.

3. In a device of the kind described, the combination with a main frame having a pair of rail surfaces on its periphery, of rollers engaging and rolling on said surfaces, the axes of said rollers being located in closer proximity to each other than the diameter of the rollers, said rollers extending entirely around the periphery of the frame, links of lesser pitch than three-fourths of the diameter of the rollers connecting said rollers, and a track shoe band passing over and having movement on the rollers.

4. In a device of the kind described, the combination with a main frame having a pair of rail surfaces on its periphery, of rollers connected in pairs engaging and rolling on said surfaces, said pairs of rollers having their axes located in closer proximity to each other than the diameter of a roller and extending entirely around the periphery of the frame, shafts joining certain rollers in pairs, links connecting the shaft and having axes of articulation common with the shafts' rotation, and a track shoe band passing over and having movement on the rollers.

5. An endless track mechanism, in combination, a frame of substantially oblong shape, overlapping rollers of approximately equal diameters connected by a flexible link-belt and having movement on the frame, and an endless track shoe band on the rollers, said band being of a depth substantially equal to the radius of a roller, and said frame having a maximum depth substantially equal to the diameter of a roller.

6. An endless track mechanism, in combination, a main frame of oblong shape, rail surfaces on said frame positioned on the respective sides of the longitudinal center line of the frame and extending entirely around the periphery of the frame, a plurality of rollers engaging and having rolling movement on each rail surface, transverse shafts joining the rollers on one rail surface with opposite rollers on the other rail surface to form connected pairs of rollers, the rollers on each rail surface overlapping each other, an endless articulated link belt connecting the transverse shafts, and a track shoe band passing over and having movement on the rollers.

7. An endless track mechanism, in combination, a main frame of oblong shape, rail surfaces on said frame positioned on the respective sides of the longitudinal center line of the frame and extending around the periphery of the frame, a plurality of rollers engaging and having rolling movement on each rail surface, alternate rollers on each rail surface being transversely offset relative to the frame whereby the rollers on each rail surface overlap each other, transverse shafts joining the rollers on the rail surfaces respectively to form connected pairs of rollers, said shafts being spaced at less than one roller diameter, a flexible band connecting and spacing the shafts, and an endless articulated track shoe band passing over and having movement on the rollers.

8. In an endless track mechanism, an oblong frame providing rail surfaces on its periphery, rollers connected by a link-belt and having rolling movement on the rail surfaces, said surfaces being located on the respective sides of the longitudinal center line of the frame and being separated by relatively tall guide flanges, a track shoe band on the rollers, spaced rail surfaces on each shoe for contact with the peripheries of the rollers, and relatively tall guide flanges separating the shoe rail surfaces, each guide flange having a base portion for contact with the inner face of the rollers and a portion sloping away from the rollers.

9. In an endless track mechanism, an oblong frame providing rail surfaces on its periphery, rollers connected by a link-belt and having rolling movement on the rail surfaces, said surfaces being located on the respective sides of the longitudinal center line of the frame, and being separated by relatively tall guide flanges, alternate rollers on each rail surface contacting the guide flange thereof and being guided thereby, a track shoe band on the rollers, and spaced rail surfaces on each shoe for contact with the peripheries of the rollers.

10. In an endless track mechanism, an oblong frame providing rail surfaces on its periphery, rollers having movement on the rail surfaces, said surfaces being located on the respective sides of the longitudinal center line of the frame, certain of the rollers with respect to each surface being inside rollers and others being outside rollers, shafts joining the rollers, a bearing tube journalling each shaft, links connecting the tubes to form an articulated band of rollers, each link being non-rotatably connected to one tube and having a loose connection with an adjacent tube, and an endless flexible tread band adapted for movement on the rollers.

11. In an endless track mechanism, a main oblong frame, a pivotal supporting journal formed centrally of the frame, said frame having a pair of parallel rail surfaces located on the respective sides of the longitudinal center line of the frame, a guide flange on the frame located transversely inwardly of each rail surface, rollers having rolling movement on each rail surface, shafts joining the rollers on one rail surface with opposite rollers on the other rail surface to form connected pairs of rollers, a band of articulated links connecting said shafts, said shafts being spaced from each other a distance less than one roller diameter whereby the rollers on each rail surface overlap, certain rollers being guided on the rail surfaces by said guide flanges, and a track shoe band adapted for movement on the rollers, said band being formed of pivotally connected shoe members, each member providing flanges located axially inwardly of the rollers.

12. In an endless track mechanism, an oblong frame providing rail surfaces on its periphery, rollers having movement on the rail surfaces, said surfaces being located on the respective sides of the longitudinal center line of the frame, certain of the rollers with respect to each surface being inside rollers and others being outside rollers, shafts joining the rollers, a bearing tube journalling each shaft, links connecting the tubes to form an articulated band of rollers, an inwardly extending dirt excluding shroud on each roller, a flexible sleeve covering the open joint between the tube and roller and being enclosed by said shroud, and an endless flexible tread band adapted for movement on the rollers.

13. In an endless track mechanism, in combination, a main frame, rail surfaces on said frame positioned on the respective sides of the longitudinal center line of the frame and extending around the periphery of the frame, a plurality of rollers engaging and having rolling movement on each rail surface, alternate rollers on each rail surface being transversely offset relative to the frame, transverse shafts joining the rollers on the rail surfaces respectively to form connected pairs of rollers, said shafts being fixed to the rollers and rotating therewith, a bearing tube journalling each shaft, links connecting the tubes to form an articulated band of rollers, and an endless flexible track shoe band passing over and having movement on the rollers.

14. In an endless track mechanism, in combination, a main frame, rail surfaces on said frame positioned on the respective sides of the longitudinal center line of the frame and extending around the periphery of the frame, a plurality of rollers engaging and having rolling movement on said rail surfaces, alternate rollers on each rail surface being transversely offset relative to the frame, transverse shafts joining the rollers on the rail surfaces respectively to form connected pairs of rollers, said shafts being fixed to the rollers and rotating therewith, a bearing tube journalling each shaft, links connecting the tubes to form an articulated band of rollers, each link having one end bifurcated and fixedly secured to a tube and its other end loosely connected with a tube, and an endless flexible track shoe band passing over and having movement on the rollers.

15. In an endless track mechinism, a frame providing rail surfaces on said frame positioned on the respective sides of the longitudinal center line of the frame and extending around the periphery of the frame, a plurality of rollers engaging and having rolling movement on said rail surfaces, alternate rollers on each rail surface being transversely offset relative to the frame, transverse shafts joining the rollers on the rail surfaces respectively to form connected pairs of rollers, said shafts being keyed to the rollers and rotating therewith, a bearing tube journalling each shaft, links connecting the tubes to form an articulated band of rollers, each link having one end bifurcated and fixedly secured to the tube, and having its other end provided with an opening for loosely engaging a tube, the end of the link loosely engaging with a tube being located within the bifurcated end of the adjacent link, and an endless flexible track shoe band passing over and having movement on said rollers.

16. In an endless track mechanism, an oblong frame providing opposite, parallel and outwardly sloping rail surfaces on its periphery, rollers connected in pairs and having movement on the rail surfaces, each roller having a sloping periphery to coincide with a rail surface, an endless track shoe band having rail surfaces opposed to those on the frame and sloping to coincide with the rollers, said shoe band having movement on the rollers and providing a flat ground engaging surface, and an integral upstanding flange formed on each shoe of the band adjacent the inner edge of each rail surface.

17. In an endless track mechanism, an oblong frame providing spaced, parallel rail surfaces on its periphery, a guide flange on the frame located transversely inwardly of each rail surface, rollers having movement on the rail surfaces, a band of articulated links having connection to said rollers, the axes of said rollers being spaced less than one roller diameter whereby the rollers on each rail surface overlap and an endless track shoe band having rail surfaces opposed to those on the frame and adapted to have movement on the rollers, each shoe of said band providing a flat ground engaging surface and having an integral upstanding flange disposed inwardly of each rail surface, said rollers being guided by said flanges.

18. In an endless track mechanism, the combination with a main frame having a pair of rail surfaces on its periphery, of rollers contacting and adapted to have rolling movement on said rail surfaces, transverse shafts joining the rollers on the rail surfaces respectively to form connected pairs of rollers, flexible means connecting the shafts and spacing them so that alternate rollers are located on the inside of each rail surface with the intermediate rollers overlapping the alternate rollers and disposed to the outside of each rail surface, each of the rail surfaces sloping laterally outwardly and the rollers having peripheries sloping laterally inwardly, and an endless track shoe band having movement on the rollers, each track shoe thereof having outwardly sloping rail surfaces for contacting the peripheries of the rollers.

19. In a device of the kind described, the combination with a main frame having rail surfaces, of overlapping rollers having rolling movement on each rail surface, a band of articulated links extending entirely around the frame and connecting the rollers, said rollers engaging the rail surfaces and also extending entirely around the periphery of the frame, the span between the axes of the rollers being less than one roller diameter, and an endless track shoe band mounted for movement on the rollers.

20. In a device of the kind described, the combination with a main frame having rail surfaces on its periphery, of overlapping rollers having rolling movement on each rail surface, a band of articulated links extending entirely around the frame and connecting the rollers, the span between the axes of the rollers being less than one roller diameter, and an endless track shoe band formed of articulated shoes passing over and having movement on the rollers, each track shoe having a pitch greater than the span between the axes of the rollers.

21. In an endless track mechanism, a main frame of oblong shape, rail surfaces on said frame positioned on the respective sides of the longitudinal center line of the frame and extending around the periphery of the frame, a plurality of rollers engaging and having rolling movement on each rail surface, alternate rollers on each rail surface being transversely offset relative to the frame whereby the rollers on each rail surface overlap each other, shafts joining certain rollers on the rail surfaces respectively to form connected pairs of rollers, the span between said shafts being less than one roller diameter, a flexible band connecting and spacing the shafts, and an endless flexible tread band passing over and having movement on the rollers.

22. In an endless track mechanism, a main oblong frame having a pair of parallel rail surfaces located on the respective sides of the longitudinal center line of the frame, a guide flange on the frame located transversely inwardly of each rail surface, overlapping rollers having rolling movement on each rail surface whereby the inside rollers are guided on the rail surfaces by said guide flanges, shafts joining the rollers on one rail surface with opposite rollers on the other rail surface to form connected pairs of rollers, a flexible band connecting and spacing the shafts, the span between said shafts being less than one roller diameter, and an endless flexible tread band passing over and having movement on the rollers.

23. In an endless track mechanism, a main oblong frame having a pair of parallel rail surfaces located on the respective sides of the longitudinal center line of the frame, rollers contacting and adapted to have rolling movement on each rail surface, transverse shafts joining the rollers on the rail surfaces respectively to form connected pairs of rollers, flexible means connecting the shafts and spacing them so that alternate rollers are located on the inside of each rail surface with the intermediate rollers overlapping the alternate rollers and disposed to the outside of each rail surface, whereby the span between said shafts is less than one roller diameter, each of said rail surfaces sloping laterally outwardly and the rollers having peripheries sloping laterally inwardly, and an endless flexible tread band passing over and having movement on said rollers.

GEORGE C. JETT.